United States Patent [19]

Flack

[11] Patent Number: 5,272,020
[45] Date of Patent: Dec. 21, 1993

[54] CYLINDRICAL ALKALINE MANGANESE DIOXIDE-ZINC CELL WITH IMPROVED BOTTOM SEALING

[75] Inventor: Robert Flack, Markham, Canada

[73] Assignee: Battery Technologies Inc., Richmond Hill, Canada

[21] Appl. No.: 994,588

[22] Filed: Dec. 21, 1992

[30] Foreign Application Priority Data

Dec. 19, 1991 [HU] Hungary .................. 4046/91

[51] Int. Cl.⁵ ............................................ H01M 2/08
[52] U.S. Cl. .................... 429/141; 429/174; 429/206; 429/224; 429/229
[58] Field of Search .............. 429/129, 131, 140, 141, 429/142, 144, 145, 164, 165, 174, 185, 224, 229, 230, 231, 94, 206

[56] References Cited

U.S. PATENT DOCUMENTS

| | | | |
|---|---|---|---|
| 3,116,172 | 12/1963 | Wilke et al. | 136/107 |
| 3,463,669 | 8/1969 | Jammett | 136/6 |
| 3,657,019 | 4/1972 | Alf et al. | 429/171 X |
| 3,980,497 | 9/1976 | Gillman | 429/145 |
| 4,091,178 | 5/1978 | Kordesch | 429/60 |
| 4,281,046 | 7/1981 | Davis, Jr. | 429/224 X |
| 4,650,680 | 3/1987 | Brenner et al. | 429/129 |
| 4,654,963 | 4/1987 | Sugalski | 429/94 X |
| 4,857,424 | 8/1989 | Larsen et al. | 429/206 |

FOREIGN PATENT DOCUMENTS

| | | | |
|---|---|---|---|
| 1671865 | 11/1969 | Fed. Rep. of Germany | 21/6 |
| 59-99657 | 6/1984 | Japan | 12/6 |
| 669479 | 3/1989 | Switzerland . | |

*Primary Examiner*—Anthony Skapars
*Attorney, Agent, or Firm*—Donald E. Hewson

[57] ABSTRACT

Cylindrical alkaline manganese dioxide-zinc cell with improved bottom sealing, where the cell comprises a coaxial assembly of a metal can closed at the bottom, a cylindrical cathode inserted in the can up to abutment at the bottom with an insulating member, a separator system in direct contact with internal surface of the cathode, a zinc anode arranged in the hollow interior of the separator system and insulated from the can, an alkaline electrolyte. The separator system extends up to the bottom end of the cathode, and a thermoplastic sealant is provided at the bottom edge zone of the separator system extending into said zone as a bead. The sealant impregnates the separator system at said edge zone.

14 Claims, 1 Drawing Sheet

CYLINDRICAL ALKALINE MANGANESE DIOXIDE-ZINC CELL WITH IMPROVED BOTTOM SEALING

FIELD OF THE INVENTION

The invention relates to a cylindrical alkaline manganese dioxide-zinc cell with improved bottom sealing, which can be used expediently in low or zero mercury secondary cells. Such cells comprise a cylindrical cathode, a zinc anode arranged in the cylindrical cavity of the cathode, a separator between the anode and the cathode and an alkaline electrolyte.

BACKGROUND OF THE INVENTION

In the correct cell operation the perfect isolation of the zinc anode and the porous manganese dioxide cathode, both soaked by the electrolyte, has an outstanding role. This task is performed by the separator system which should ensure good ionic connection between the two electrodes.

The use of double layer separators in alkaline cells has been known for a long time. Jammett, in U.S. Pat. No. 3,463,669 applies semipermeable materials such as regenerated cellulose or starch to a felted nylon fabric. Carboxymethyl cellulose in the nylon mat serves as a setting agent. Water soluble polyvinyl alcohol fibers bond viscose rayon and non-soluble polyvinyl alcohol fibers into a thin mat which may contain nonionic surfactants as wetting agents.

Gilman discloses in U.S. Pat. No. 3,980,497 methods of sandwiching a cellophane membrane between two layers of absorbent material using carboxymethyl cellulose or the like as a bonding agent.

For rechargeable cells, Kordesch recommends in U.S. Pat. No. 4,091,178 a cellophane/Pellon laminate with the cellophane placed against the anode and the Pellon placed against the cathode.

The use of a fibrous separator material is required in several types of alkaline cells to maintain the required electrolyte concentration and to prevent portions of the cell from drying out during use.

While much research work has been done concerning the choice of an optimum separator system, the problems connected with the sealing of the bottom edge of the separator have not been solved so far to a satisfactory extent.

In cylindrical cells, in which the electrodes are arranged coaxially around each other, the separator takes a thin cylindrical form. There are known solutions for forming the separator as an upright cylinder with a closed bottom. Since separator materials are made generally of a multi layer structure of different materials, the required folding of the bottom end of the cylinder is associated with wrinkling of the materials and special measures have to be taken to overcome such difficulties.

In Swiss patent No. 669,479 issued to Ruetschi, a multi layer separator cylinder was used, in which a hot melt sealant served to close the bottom. In a first embodiment, the sealant was applied on the top of the folded bottom portion; in a second embodiment the lower edges of the cylindrical separator were folded back and a plastic disc with stepped diameter was attached from above to the folded lower rim of the separator and the hot melt was applied between the stepped portion of the disc and the interior of the separator cylinder.

In all embodiments of the Ruetschi patent, the separator cylinder was mechanically reinforced by two perforated metal cylinders between which it was sandwiched. In the separator system itself a fibrous cylinder was used which formed the outer one of the multi layer system, i.e. it faced the cathode.

In the third embodiment, a disc was placed to fit in the bottom portion of the outer metal cylinder and the hot melt was applied on the top of the disc and filled the interior of the sandwiched structure up to a predetermined height.

The so-obtained reinforced and closed cylindrical separator system was thereafter inserted in the cathode cylinder as a ready made unit, i.e. in the Ruetschi patent the old principle of providing a separator cylinder closed at the bottom was utilized.

There are requirements concerning the separator system which cannot be harmonized with the above principle; e.g. it is often beneficial if the layers are wound to form the separator, but the mechanical strength of such a structure is insufficient for supporting a closed bottom as a self contained unit. The use of perforated metal cylinders at either side of the separator has been overcome by technical progress, and the lack of such a reinforcement system imposes further difficulties in following the above disclosed principles.

A further problem connected with the use of a separator system closed at the bottom lies in the inefficient utilization of available active cathode and anode volumes. The cathode cylinders can extend to the bottom of the cylindrical can of the cell, however, a think plastic disc is often used as an abutment member at the lower end of the cathode. The separator cylinder which is closed at the bottom and made as a self contained unit can be inserted in the hollow interior of the cathode up to a depth where the bottom face of the cylinder abuts the upper face of the plastic disc—i.e., the bottom edge of the cathode cylinder is at the same level as the bottom edge of the separator system. In such a separator system, the bottom sealing or closure require a certain height, which is not negligible compared to the full height of the cell. A certain height is required for the folding back of the bottom edge of the separator, for receiving the sealant which has to be self-supporting. This height zone can be considered as a volume loss, since the cathode material encircling it cannot actively contribute to the cell function.

The object of the present invention is to provide a cylindrical manganese dioxide-zinc cell with improved bottom sealing, wherein the requirements imposed on the separator system can be fulfilled without regard to the manner in which the bottom sealing is made, and which allows a better utilization of available cell volume.

It has been found according to the present invention that most of aforementioned problems can be overcome, if the separator system is inserted as a hollow upright cylinder open at both ends into the hollow inner space of the cathode to extend up to the end of the cathode, and a thermoplastic sealant is applied at this phase of the cell assembly to cover the bottom edge zone of the separator system and to impregnate it in this zone.

The advantages of this kind of bottom sealing are clearly understandable, since there will be no need for folding back the bottom end of the separator and there will be no need for making the separator as a self contained unit. A further advantage lies in that the sealant does not take a significant volume, and for that reason the whole cathode and anode mass can participate in the cell operation.

It is preferable that a disc or ring-like insulator washer be placed between the bottom of the can and that of the cathode, and that the separator system and the sealant extends at the contact zone of the edge of the separator and the washer and takes the form of a thin concave bead. In the ring-like design, the sealant can cover the inner surface of the tip of the can below the washer.

In the case of low mercury or mercury free cells, it is preferable that the separator system comprises a wound structure of a first layer of a fibrous sheet material that can be soaked by the electrolyte and a second layer having a microporous structure and being impervious to solid particles that can be present in the cell. Both layers are ion permeable, and the first layer contacts the anode.

In that arrangement, it is preferred if the second layer encircles the first one so that all paths of solid particles between spaces separated by the separator, including those that lead through edge regions of the fibrous first layer, are blocked by the second layer.

The thermoplastic sealant can be asphalt or any kind of commercially available hot melt.

The basic advantages of a cell made according to the invention will be apparent if the cell is a secondary one. However, the invention can well be used in case of primary cells as well.

BRIEF DESCRIPTION OF THE DRAWINGS

The invention will now be described in connection with preferred embodiments thereof, in which reference will be made to the accompany drawings. In the drawing.

DESCRIPTION OF THE PREFERRED EMBODIMENTS

Figures 1, 2:
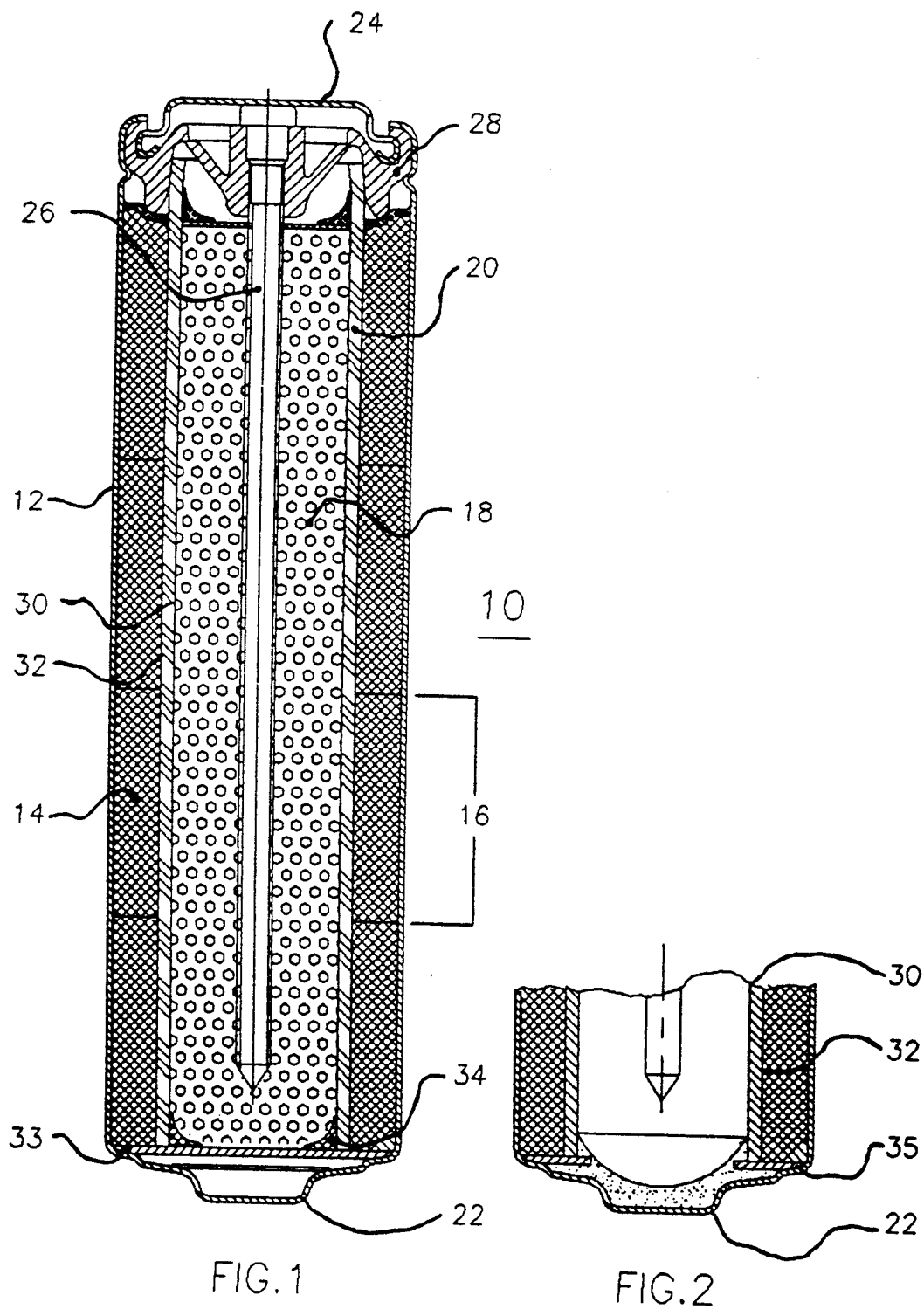
FIG. 1 is a sectional elevational view of a cell embodying the invention.
FIG. 2 is an enlarged cross-sectional view of the bottom portion of a second embodiment.

FIG. 1 shows a cross sectional elevation view of an alkaline manganese dioxide zinc rechargeable cell 10. The cell comprises the following main units: a steel can 12 defining a cylindrical inner space, a manganese dioxide cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity between the anode and the cathode is provided by the presence of potassium hydroxide electrolyte added into the cell in a predetermined quantity.

The can 12 is closed at the bottom, and it has a central circular pip 22 serving as the positive terminal. The upper end of the can 12 is hermetically sealed by a cell closure assembly which comprises a negative cap 24 formed by a thin metal sheet, a current collector nail 26 attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively.

The separator 20 consists of two layers i.e.: a first or inner layer 30 made of a fibrous sheet material wettable by the electrolyte, and a second or outer layer 32 being impermeable for small particles but retaining ionic permeability. An expedient material for the first layer 30 is Dexter paper (grade 7490 or 7498-2). The difference between these two types of paper lies in their thickness. Grade 7490 paper has a thickness of 120 microns, while grade 7498-2 paper is 175 microns thick. Both types of these material can be used in primary and secondary cells to mechanically separate the anode and the cathode electrodes and to serve as an electrolyte reservoir. The macroporous structure of the inner layer 30 cannot prevent solid contamination particles from moving between the two separated spaces.

This separation is provided by the second layer 32 which has a microporous structure and is made preferably by an appropriate thin cellophane layer. A suitable material for this purpose is the so called "sausage skin" manufactured e.g. by the Finnish company Oy Visko under the commercial name: Delfei 55/50.

The two layers 30 and 32 can be wound together to form the separator 20. The outer cellophane layer 32 is preferably longer than the inner layer 30. Owing to the increased length, the cellophane layer extends over the end of the inner layer 30 and will adhere to its own material in an overlapping zone. The so-obtained closed cross sectional profile of the cellophane layer seals the edges of the inner layer made of fibrous material.

The sealing of the bottom part of the cell can be made by using an insulator washer 33 shown in FIG. 1 which is placed to abut the bottom portion of the can 12 prior to the insertion of the cathode pellets 16. The double-layered separator 20 is inserted thereafter so that its bottom edge abuts the insulator washer 33. In this phase, the contact zone between the bottom of the separator 20 and the washer is sealed by the application of a controlled amount of a hot melt or a similar thermoplastic sealant like asphalt. The sealing is done by means of an appropriate heated tool which is inserted deeply in the cylindrical cavity defined by the cathode and this sprays a predetermined amount of melt sealant to the contact zone. After solidifying the sealant will have a concave profile with small height and width as shown by 34 in FIG. 1.

The main advantage of the suggested kind of sealing lies in that there will be no need for folding the bottom part of the separator that would otherwise cause wrinkles or cracking. A further advantage is the small width of the sealant, whereby the presence of this material cannot cover or isolate a noticeable portion of the separator and this enables full utilization of the available cathode and anode materials.

In an alternative embodiment shown in FIG. 2, a ring 35 is used instead of the washer 33. The ring 35 has an inner diameter slightly smaller than that of the separator 20. After placing the separator 20 in the assembly, a sealant is applied in melt form and the seal covers the interior of the pip 22 of the can 12 and extends beyond the inner edge of the ring and covers a small portion from the separator. This embodiment offers similar advantages as the previous one; however, the coverage of the active portion of the cell can be reduced to a somewhat larger extent.

Owing to the fact that in both embodiments the fibrous separator layer 30 contacts the sealant, and in molten state the sealant penetrates the pores of the fibrous structure, a more reliable sealing will be obtained. This can be understood because the electrolyte cannot creep in downward direction along the fibrous paper material to the edge of the separator which forms the critical zone concerning leakage, since the pores of the inner layer will be saturated by the sealant.

What is claimed is:

1. Cylindrical alkaline manganese dioxide-zinc cell (10) with improved bottom sealing, comprising a coaxial assembly of a metal can (12) closed at the bottom, an insulating member (33) located at said bottom, a cylindrical cathode (14) inserted in said can up to abutment at the bottom with said insulating member and defining a hollow interior, a separator system (20) open at the bottom end in direct contact with the internal surface of the cathode, a zinc anode (18) arranged in the hollow interior of the separator system and insulated from the can, and an alkaline electrolyte;

characterized in that said separator system extends up to the bottom end of said cathode, and a thermoplastic sealant is provided at the bottom edge zone of the said separator system and extends into said zone as a bead;

and wherein said sealant impregnates said separator system at said edge zone.

2. The cell as claimed in claim 1, wherein said insulating member is a washer arranged between the bottom end of the can and the cathode, the separator system abuts the upper face of said washer, and said sealant extends as a thin concave ring at the contacting zone of the separator and the washer.

3. The cell as claimed in claim 2, wherein said separator system comprises a wound structure of a first layer of a fibrous sheet material that can be soaked by said electrolyte and a second layer having a microporous structure and being impervious to solid particles that can be present in said cell, wherein both layers are pervious to ions of said electrolyte, and said first layer is in contact with said anode.

4. The cell as claimed in claim 3, wherein said second layer encircles said first layer so that all paths of solid particles between spaces separated by the separator, including those that lead through edge regions of said first layer, are blocked by said second layer.

5. The cell as claimed in claim 2, wherein said sealant is asphalt.

6. The cell as claimed in claim 2, wherein said sealant is a hot melt.

7. The cell as claimed in claim 1, wherein said can comprises a pip in the central portion of the bottom zone thereof and said insulating member is a washer arranged between the bottom end of the can and the cathode; wherein said washer has the form of a ring with a central opening that has a diameter slightly smaller than the inner diameter of said opening, and said ring covers the inner surface of said can at the bottom thereof so as to insulate the can from the anode.

8. The cell as claimed in claim 7, wherein the separator system abuts the upper face of said washer, and said sealant extends as a thin concave ring at the contacting zone of the separator and the washer.

9. The cell as claimed in claim 7, wherein said separator system comprises a wound structure of a first layer of a fibrous sheet material that can be soaked by said electrolyte and a second layer having a microporous structure and being impervious to solid particles that can be present in said cell, wherein both layers are pervious to ions of said electrolyte, and said first layer is in contact with said anode.

10. The cell as claimed in claim 9, wherein said second layer encircles said first layer so that all paths of solid particles between spaces separated by the separator, including those that lead through edge regions of said first layer, are blocked by said second layer.

11. The cell as claimed in claim 7, wherein said sealant is asphalt.

12. The cell as claimed in claim 2, wherein said sealant is a hot melt.

13. The cell as claimed in claim 1, wherein said cell is a low mercury or mercury free type.

14. The cell as claimed in claim 13, wherein said cell is a secondary cell.

* * * * *